(12) United States Patent
Hundscheidt et al.

(10) Patent No.: US 6,947,434 B2
(45) Date of Patent: Sep. 20, 2005

(54) SUBGROUP MULTICASTING IN A COMMUNICATIONS NETWORK

(75) Inventors: Frank Hundscheidt, Kerkrade (NL); Heino Hameleers, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1025 days.

(21) Appl. No.: 09/884,163

(22) Filed: Jun. 20, 2001

(65) Prior Publication Data

US 2002/0085506 A1 Jul. 4, 2002

Related U.S. Application Data

(60) Provisional application No. 60/248,836, filed on Nov. 16, 2000.

(51) Int. Cl.[7] .......................... H04L 12/28; H04L 12/56; G01R 31/08
(52) U.S. Cl. ......................... 370/401; 370/390; 370/252
(58) Field of Search ................................ 370/401, 432, 370/390, 400, 252, 256, 519, 392; 709/242, 252

(56) References Cited

U.S. PATENT DOCUMENTS 6,757,294 B1 * 6/2004 Maruyama .................. 370/432

2002/0150094 A1 * 10/2002 Cheng et al. ............... 370/389

OTHER PUBLICATIONS

Andrew S. Tanenbaum: "Computer Networks", Third Edition, Prentice–Hall, New Jersey, 1996.
IP Multicast Initiative (IPMI): IP Multicast Glossary; Stardust Technologies, Inc., Campbell, CA USA. Web: www.ipmulticast.com.
IP Multicast Initiative (IPMI): Introduction to IP Multicast Routing; Stardust Technologies, Inc., Campbell, CA USA. Web: www.ipmulticast.com.

(Continued)

*Primary Examiner*—Duc Ho (57) ABSTRACT

A message is distributed from a source to one or more hosts in a communications network that comprises one or more multicast capable routers. To do this, a first multicast capable router generates a first table that identifies sub-branches connected to the first multicast capable router, and for each identified sub-branch, includes membership-related information from which it can be determined how many hosts are part of the sub-branch and (optionally) a metric associated with each of the sub-branch hosts. The multicast capable router then receives the message to be distributed and a first value, N1, that specifies how many hosts the message is to be distributed to, and uses the first table to identify N1 hosts and their respective sub-branches. It distributes the message to each of the identified sub-branches along with a second value that specifies how many hosts within the sub-branch the message is to be distributed to.

58 Claims, 4 Drawing Sheets

OTHER PUBLICATIONS

IP Multicast Initiative (IPMI): IP Multicast Backgrounder; Stardust.com, Inc. Web: www.ipmulticast.com.

IP Multicast Initiative (IPMI): How IP Multicast Works; Stardust Technologies, Inc., Campbell, CA USA. Web: www.ipmulticast.com.

IP Multicast Initiative (IPMI):IP Multicast Backgrounder; Stardust Technologies, Inc., Campbell, CA USA. Web: www.ipmulticast.com.

Andrew S. Tanenbaum: "Distributed Operating Systems", Prentice–Hall, New Jersey, 1995.

Coulouris et al.: "Distributed Systems: Concepts and Design", Second Edition; Addison–Wesley, Workingham, 1994.

Internet Group Management Protocol, Version 3 (IGMPv3): at http://search.ietf.org/internet–drafts/draft–ietf– idmr–igmp–v3–04.txt.

"IPv4 Option for Somecast" at http://search.ietf.org/internet–drafts/draft–dhelder–somecast–00.txt.

Todd Montgomery: "Design, Implementation, and Verification of the Reliable Multicast Protocol" –Thesis; submitted to the Graduate Program in Engineering, West Virginia University, 1994.

\* cited by examiner

SUBGROUP MULTICASTING IN A COMMUNICATIONS NETWORK

CROSS REFERENCE TO RELATED APPLICATIONS

This application claims the benefit of U.S. Provisional Application No. 60/248,836, filed Nov. 16, 2000, which is hereby incorporated herein by reference in its entirety.

BACKGROUND

The present invention relates to networking and communications technology, and more particularly to multicasting information from a source node to one or more destination nodes in a digital communications network.

Digital communications networks, such as the Internet, are well-known systems for permitting information stored at one location to be distributed to one or more users situated at geographically different locations. The information (also referred to herein as a "message") can take any of a number of forms including, but not limited to, text, still image, audio, and video information.

While it is not unusual to use a digital communications network to move information (e.g., a file) from one source to one destination, it is becoming increasingly desirable to communicate the same information from one source to multiple destinations. For example, it is common for many recipients to view the same information, such as streaming video, originating at a single Internet web site.

One technique that permits information to be communicated between a plurality of sources and destinations is called "multicasting". As an example, multicasting, as is supported by the Internet Protocol (IP), has been defined as follows: "IP Multicast is the efficient transmission of an IP datagram to a set of zero or more hosts identified by a single IP destination address." (Deering, 1989). This will now be discussed in greater detail.

(IP) MULTICASTING

IP (and other types of) multicast efficiently supports one-to-many and many-to-many transmission by enabling sources to send a single copy of a message to multiple recipients (indirectly identified by a single IP class-D multicast address) who explicitly want to receive the information. This mechanism is far more efficient than sending multiple messages to each recipient simultaneously or broadcasting the message to all nodes on the network. IP multicasting is a natural solution for multi-party conferencing because of the efficiency of the data distribution trees (spanning trees), with data being replicated in the network at appropriate points rather than in end-systems.

Multicasting is based on a series of specific protocols that "ride on top" of the existing ones to efficiently distribute data to all interested parties. With IP multicast, receivers do not need to know who or where the senders are in order to receive traffic from them. Senders never need to know who the receivers are. Neither senders nor receivers need to care about the network topology because the network optimizes delivery.

Multicast is a receiver-based concept; receivers join a particular multicast session group by using a protocol such as the Internet Group Management Protocol (IGMP) to inform a multicast router on their subnetwork of their intention. Traffic is then delivered to all members of that group by the network infrastructure. To verify current membership, the local multicast router periodically sends an IGMP host membership query to the "all-hosts" group. To avoid congestion that would otherwise occur if each member host were to respond to the query, each host delays transmission of its report by a random time interval. At the end of the time interval, the host sends its report only if it has not seen a report for the same group from another host. As a result, only one membership report is sent in response for each active group address, although many hosts may have memberships. IGMP may also be used to forward the group membership information from the local router to the other multicast routers.

For delivery of a multicast packet from the source to the destination nodes on other networks, multicast routers need to exchange the information they have gathered from the group membership of the hosts directly connected to them. There are many different algorithms and protocols for exchanging this routing information, such as Distance Vector Multicast Routing Protocol (DVMRP), Multicast extension to Open Shortest Path First (MOSPF), and Protocol Independent Multicast (PIM). Based on the routing information obtained through one of these protocols, whenever a multicast packet is sent out to a multicast group, multicast routers decide whether to forward that packet to their network(s) or not. Finally, the leaf router determines whether there is any member of that particular group on its physically attached networks based on the IGMP information and decides whether to forward the packet or not.

If the sender layers its information (e.g., video or audio) stream, different receivers can choose to receive different amounts of traffic and hence different qualities. To do this the sender must code the information as a base layer (the lowest quality that might be acceptable) and a number of enhancement layers, each of which adds more quality at the expense of more bandwidth. Where the information is video information, for example, these additional layers might increase the frame rate or increase the spatial resolution of the images or both. Each layer is sent to a different multicast group and receivers can individually decide how many layers to subscribe to.

Figure 1:
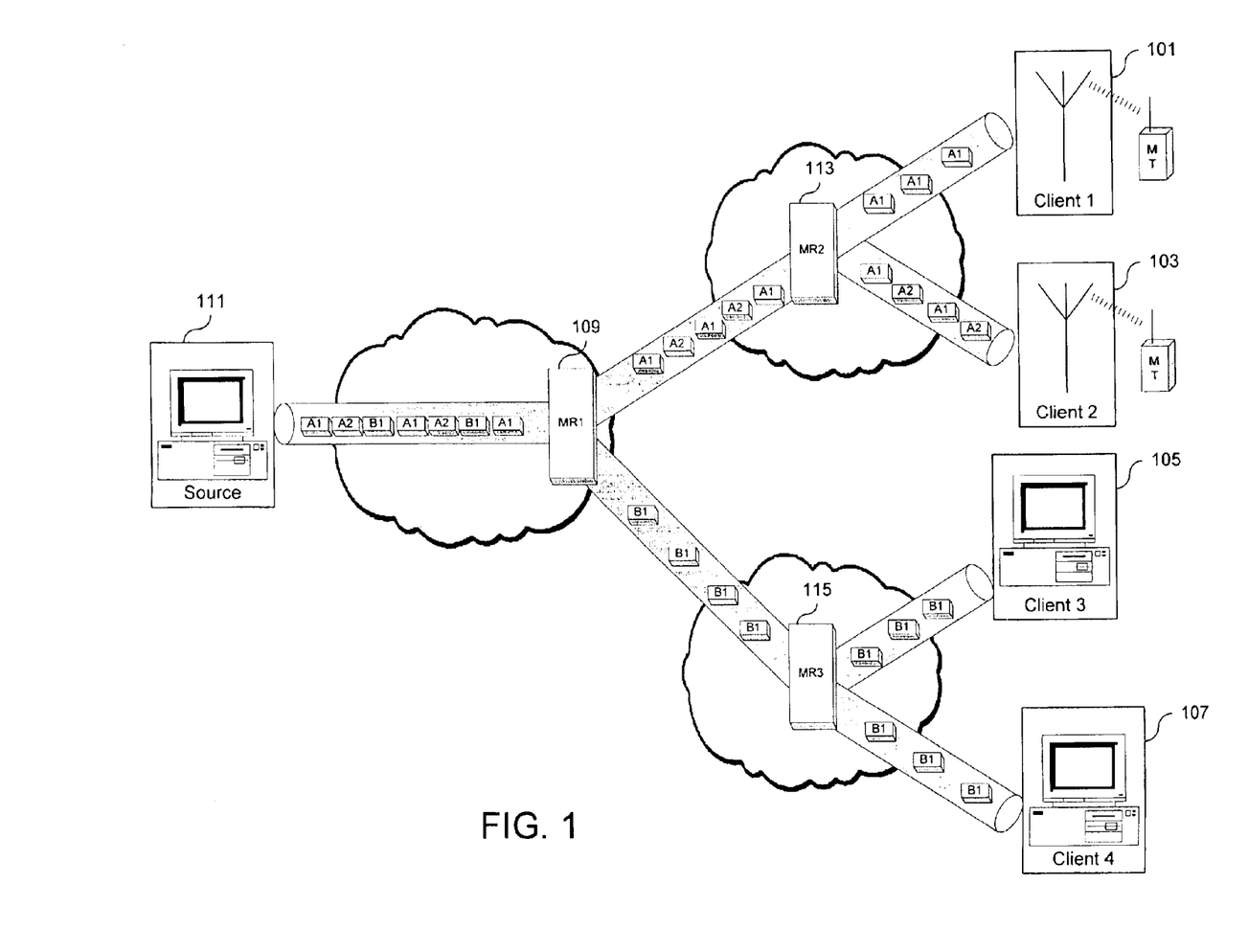
FIG. 1 shows an example of an IP multicast scenario in which a video stream is sent to four recipients in a digital communications network.

FIG. 1 shows an example of an IP multicast scenario in which an information stream (e.g., a video stream) is sent to each of four recipients: a first client 101, a second client 103, a third client 105, and a fourth client 107. A first multicast router (MR1) 109 is capable of routing information between a source 111 and each of second (MR2) and third (MR3) multicast routers 113, 115. The first and second clients 101, 103 have joined the group by informing the second multicast router 113; and the third and fourth clients 105, 107 have done the same with the third multicast router 115. The first client 101 receives a base layer (packets denoted "A1"), such as one suitable for a codec optimized for wireless environments, whereas the second client 103 receives this base layer and an additional layer (packets denoted "A2") for a better quality of service (e.g., a better video quality). The third and fourth clients 105, 107 each receive a different base layer of packets (e.g., a layer suitable for a wireline codec), denoted "B1".

To achieve an efficient transmission, a spanning tree is constructed, that connects all members of the multicast group. Only one copy of a multicast message will pass over any link in the network (between the source server 111 and the first multicast router, MR1, 109), and copies of the message will be made only where paths diverge at a router (e.g., at the three multicast routers MR1 109, MR2 113 and MR3 115). Note that the "merging" of multicast streams at traffic replication points (such as MR1 109, MR2 113 and MR3 115) involves complex algorithms.

More information about IP Multicasting can be found in Andrew S. Tanenbaum, *Computer Networks,* Third Edition, Prentice-Hall, New Jersey, 1996; and on the Internet at the website for "IP Multicast Initiative (IPMI)": www.ipmulticast.com Reliable Multicasting IP multicast is unreliable (based on User Datagram Protocol, or "UDP") and provides best effort delivery, which results in occasional packet drops. For many multicast applications that operate in real-time, such as audio and video, this may be acceptable (as long as the packet loss is within reasonable limits). However, for some applications (e.g., synchronization messages between replicas) it is necessary to ensure that no critical information is lost.

Some of the typical issues that reliable multicast protocols have to handle are the following:

Network overload when packet reception is confirmed (ACK) or packet loss is indicated (NACK), also called the ACK/NACK implosion effect. This is usually solved by aggregation mechanisms.

Group management; closed, open limited and open unlimited groups.

Congestion control

Scalability

A variety of reliable protocols and frameworks (e.g. Reliable Multicast Framework) have been proposed for multicast data delivery. Unlike the unicast case where requirements for reliable, sequenced data delivery are fairly general, different multicast applications have widely differing requirements for reliability. For example, some applications require that delivery obey a total ordering while many others do not. Some applications have many or all the members sending data while others have only one data source. Some applications have replicated data, so several members are capable of transmitting a data item while for others all data originates at a single source. These differences all affect the design of a reliable multicast protocol. Some examples of reliable multicast protocols are:

Reliable Multicast Protocol (RMP)

Scalable Reliable Multicast (SRM)

Reliable Multicast Transport Protocol (RMTP)

Multicast File Transfer Protocol (MFTP)

The RMT (Reliable Multicast Transport) Working Group in IETF expects to initially standardize different protocol instantiations for one-to-many multicast applications. See the website for the Reliable Multicast Transport (RMT) Working Group in IETF at www.ietf.org/html.charters/rmt-charter.htm/.

More information about reliable multicast can be found at, for example, the IP Multicast Initiative (IPMI) website: www.ipmulticast.com.

Real-Time Transport (Control) Protocol, RT(C)P

The Real-Time Transport Protocol (RTP) provides end-to-end network transport functions suitable for applications transmitting real-time data, such as audio, video or simulation data over multicast or unicast network services. The functions provided by RTP include payload type identification, sequence numbering, timestamping, and delivery monitoring.

The data transport is augmented by a control protocol (RTCP), which is used to monitor the Quality of Service (QoS) and to convey information about the participants in an ongoing session. Each media stream in a conference is transmitted as a separate RTP session (with a separate RTCP stream). RTCP reports provide statistics about the data received from a particular source, such as the number of packets lost since the previous report, the cumulative number of packets lost, the inter-arrival jitter, and the like.

REPLICATION AND (QUORUM CONSENSUS) SYNCHRONIZATION

A service or resource is "replicated" when it has multiple logically identical instances appearing on different nodes in a system. A request for access to the resource can be directed to any of its instances. Several mechanisms are available to synchronize the different copies (also called replicas) and keep them consistent. In case of replication, a different service access point (e.g., IP address) is used for each service instance.

The main reasons for replicating services are the following:

Load distribution (service copied to multiple hosts)

Performance increase (service copied to multiple hosts and possibly closer to the actual client(s))

Availability (service copied to multiple hosts)

Replication is typically used when all clients need write access to the whole service (or when the service cannot be split into separate entities).

Replica Synchronization

In the case of shared data via a network, participants may attempt to manipulate a shared object (almost) at the same time. Concurrent actions on a shared object may result in inconsistent views among users. Without careful coordination, a sequence of concurrent actions would soon cause different views of what is supposed to be the same shared data.

Replicated resources need to be kept synchronized/consistent/coherent; that is, any write access needs to be communicated to all the replicas. There are basically two approaches for such synchronization:

Master/slave strategy

With this approach there is one primary server, holding the master copy, and several secondary servers (for each replica). The master copy services all the update requests, whereas the slave replicas are updated (synchronized) by receiving changes from or by taking copies from the primary server. Clients can read data from both the master and the slave representatives.

The primary server may be flexible or fixed. In the case of a flexible primary server, writes can be done to any server. The corresponding server then takes the responsibility for updating all replicas. This procedure is also called Read-One-Write-All (ROWA). In the case of a fixed server (also called "simple ROWA"), all writes have to be done to that server. Although this mechanism has a central point of failure (the primary server), the centralized control makes it relatively easy to resolve conflicts between requests and to maintain consistency. Several enhancements have been defined for both the flexible and fixed primary server models.

Distributed update control (voting)

This approach is more robust than the master/slave strategy in that no central point of failure (master) is needed. The basic idea is to require clients to request and acquire the permission of multiple servers before either reading or writing a replicated file. The corresponding strategies are known as Quorum-Consensus (QC) mechanisms.

Several variations have been defined, such as:

Uniform Majority QC: permission from a majority of the servers is needed for each write and read access.

Weighted Majority QC: similar to Uniform Majority QC, but now a server may have more than one vote (e.g., reliable or high-speed servers).

Voting with ghosts: a dummy (ghost) server is used for each server that is down. The ghost may only join a write quorum. This mechanism makes sure that a write quorum consensus is still possible in case a few servers are down (since the write quorum often consists of most servers.)

Many more mechanisms have been defined, The general strategy is always:

to reduce the size of the quorum (for write and read accesses) in order to speed up the synchronization process (and reduce the network communication); and, to limit the impact of server failures (e.g., voting with host).

A coherence protocol is a specific implementation of a coherence/synchronization model. There may be several protocols for a single model. Which protocol is best may depend on issues such as read/write ratios, the number of clients simultaneously accessing a service, and the like. The standard against which all models are measured is sequential consistency, which means that all processes see all memory references in the same order. Causal consistency, Pipelined Random Access Memory (PRAM) consistency, and processor consistency all weaken the concept that processes see all memory references in the same order. Another approach is that of weak consistency, release consistency, and entry consistency, in which memory is not consistent all the time, but the programmer can force it to become consistent by certain actions, such as entering or leaving a critical region.

In a Local Area Network (LAN) it is feasible to have a central coordinator taking care of the synchronization between the different replicas. However, in a Wide Area Network (WAN) this central approach is usually not feasible, due to the high latencies involved (takes too much time to update all the replicas) and the central point of failure. In a WAN there is therefore a need for a distributed approach. More details about synchronization strategies can be found in Andrew S. Tanenbaum, *Distributed Operating Systems*, Prentice-Hall, New Jersey, 1995; and Coulouris at al., *Distributed Systems: Concepts and Design*, Addison-Wesley, Wokingham, 1991.

With multicasting, the information is always sent to all clients that have registered for the corresponding multicasting group (and are listening to the multicast port). In the case of a closed multicasting group, the number of clients may be known.

A draft of the Internet Group Management Protocol, Version 3 (IGMPv3), which may be found on the Internet at http://search.ietf.org/internet-drafts/draft-ietf-idmr-igmp-v3-04.txt, will add source selection possibilities, such as listening to some sources only or to all but a set of unwanted sources. However, there is a problem in that no mechanism is yet foreseen to enable one to multicast to only a subset of the membership hosts.

Sometimes (e.g., for QC synchronization) there may be a need to have a type of multicasting wherein one can define the size of the subgroup (out of the total multicasting group). This means that one defines the number of recipients of a certain multicast message. In the case of QC synchronization, one can define the number of recipients that should receive a certain synchronization message.

As described above, RTCP is used to convey information about the participants in an ongoing session. This information is provided end-to-end, that is, from the destinations to the source and only works in cases in which the RTP protocol is used for transport (usually real-time multimedia data).

A recent IETF draft (namely, "Ipv4 Option for Somecast", available via the Internet at the following website: http://search.ietf.org/internet-drafts/draft-dhelder-somecast-00.txt) describes "Somecast", which is a mechanism that includes up to nine destination addresses in an IP header and performs combined unicast routing as long as the destinations have to use the same links. When routers determine that a destination uses a different link, the packet is sent as a normal unicast. As also stated in the IETF draft, this solution is not scalable. Furthermore, it has drawbacks, such as the requirement that the source must already know all the destinations.

There is therefore a need for a mechanism that will enable the multicasting of messages to only a subgroup of a defined set of membership hosts.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatus for distributing a message from a source to one or more hosts in a communications network that comprises one or more multicast capable routers. This is done by, in a first multicast capable router, generating a first table that identifies sub-branches connected to the first multicast capable router, and for each identified sub-branch, includes membership-related information from which it can be determined how many hosts are part of the sub-branch. The first multicast capable router receives the message to be distributed and a first value, N1, that specifies how many hosts the message is to be distributed to. It then uses the first table to identify N1 hosts and their respective sub-branches, and distributes the message to each of the identified sub-branches along with a second value, N2, that specifies how many hosts within the sub-branches the message is to be distributed to.

In another aspect of the invention, at least one of the identified sub-branches includes a second multicast capable router; and the technique further comprises: in each of the second multicast capable routers, generating a second table that identifies sub-branches connected to the second multicast capable router, and for each identified sub-branch, includes membership-related information from which it can be determined how many hosts are part of the sub-branch; in the second multicast capable router, using the second table to identify N2 hosts and their respective sub-branches; and in the second multicast capable router, distributing the message to each of the identified sub-branches along with a third value, N3, that specifies how many hosts within the sub-branches the message is to be distributed to. In this way, a recursive technique of distributing the message to a sub-group is effected.

In alternative embodiments, the sub-branch may simply distribute the message to all hosts within the sub-branch. In other alternatives, the message may be unicast to particular hosts within the sub-branch.

In other embodiments, of the invention, the generated tables further include one or more metrics associated with each of the sub-branch hosts. The various metrics may alternatively indicate any of the following: a distance between the sub-branch host and the second multicast capable router; a delay between the sub-branch host and the second multicast capable router; a cost associated with communication between the sub-branch host and the second multicast capable router; a bandwidth associated with communication between the sub-branch host and the second multicast capable route; a transmission delay between the sub-branch host and the second multicast capable router; and/or a reliability measure.

The invention further comprises techniques for determining how many hosts are situated within sub-branches of a communication network.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system and/or communications network. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

The invention presents methods and apparatuses that make it possible to multicast a message to only a subgroup of a total group of multicast recipients. The sub-group of multicast recipients can be distributed among different sub-branches of the network, or can all be located within a single sub-branch. To illustrate the various aspects of the invention, reference is made to FIG. 2, which is a block diagram of a portion of a communications network that comprises a number of Hosts (H1, H2, H3, H4, H5, H6, H7, H8) interconnected in various ways by means of multicast capable routers (R1, R3, R6, R7, R8) and standard (non-multicast capable) routers (R2, R4, R5). It can be seen that with respect to any of the routers R1, . . . , R8, a number of sub-branches may be defined. For example, the sub-branch 201 is one of a number of sub-branches of router R1. Sub-branch 201 comprises routers R7 and R8 and Hosts H7 and H8. Routers within any of the sub-branches may themselves have sub-branches. For example, with respect to the router R7 (which is included within sub-branch 201), there are two sub-branches defined: a first sub-branch 203 that comprises router R8 and Host H8; and a second sub-branch that comprises only the Host H7.

In order to be able to perform a subgroup multicasting where the source (or any other instance) defines the number of recipients of the message, the following may be done:

1. Count the total number of recipients available to the entity that is to perform the sub-group multicasting (if this information is not already available via some other means, e.g., via administration).
2. Count the number of recipients per sub-branch.
3. Multicast the information only to a subgroup of the total group of multicast recipients.

In order for the subgroup multicasting to be efficient, it may be based on any of the metrics that are used for the (multicast) routing protocols (such as distance, delay, cost, bandwidth, reliability and the like). In alternative embodiments of the invention, subgroup multicasting can be based on combinations of metrics, rather than on just single metrics. Merely for the sake of facilitating an understanding of the invention, only single metrics are illustrated in the exemplary embodiments described herein.

It should be understood that it is not essential to practicing the invention that the three steps described above be performed separately. For example, embodiments can be constructed in which the counting of the number of recipients per sub-branch also results in knowledge about the total number of recipients available to the entity that is to perform the sub-group multicasting, so that steps 1 and 2 are really combined into a single step.

It should be further understood that sub-group multicasting can be a recursive process, whereby each multicast-capable router either forwards the message to a sub-branch having no multicast-capable routers (whereby each Host in that sub-branch will receive the message, e.g., by means of unicasting), or else generates and sends its own sub-group multicast command to one or more of its sub-branches, thereby letting the one or more multicast-capable routers within each of those sub-branches make the determination of exactly which Hosts will receive the message. (Of course, a multicast-capable router is not required to use multicasting when forwarding messages to its sub-branches—it can also have the option of sending dedicated unicast messages to just the number of members that have to be informed according to the received multicast message.)

A reliable performance may be achieved by applying any of the reliable multicasting mechanisms and protocols (e.g., such as those described in the BACKGROUND section of this disclosure).

Figure 3:
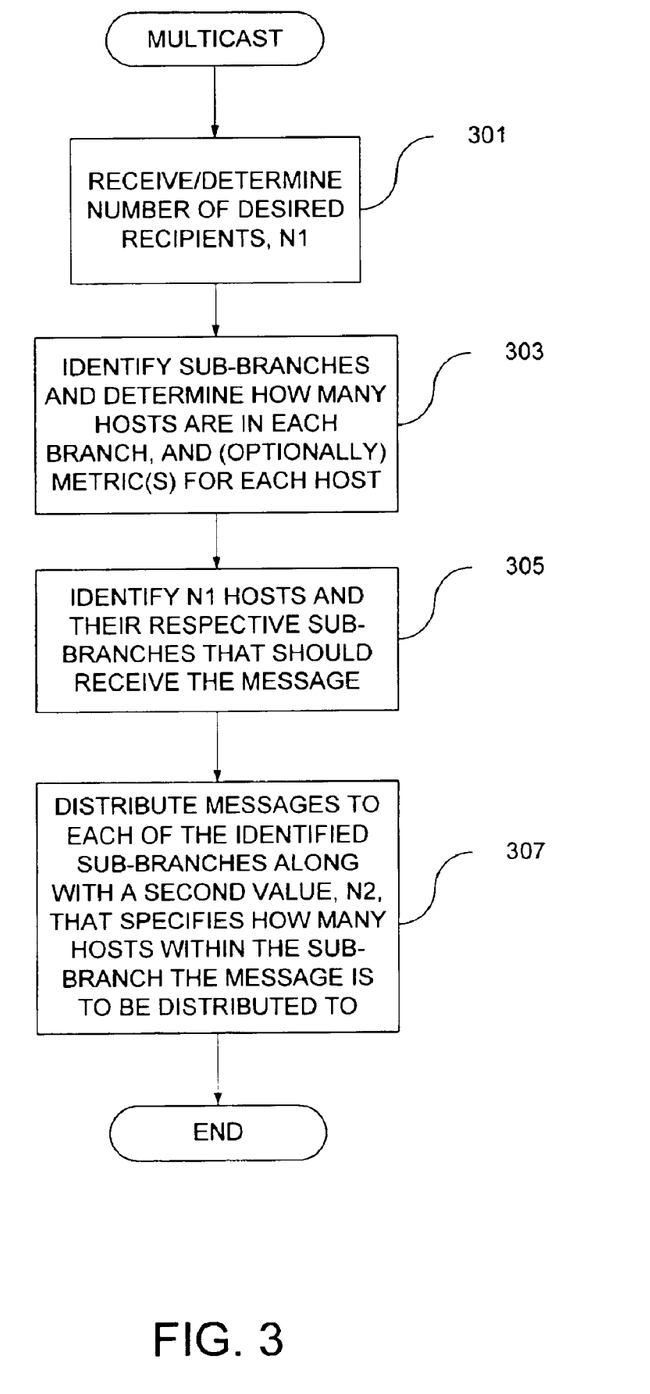
FIG. 3 is a flow chart depicting a technique for multicasting information to a number of hosts, in accordance with one embodiment of the invention.

An exemplary embodiment of a technique for multicasting a message from a multicast capable router to one or more hosts is depicted in the flowchart of FIG. 3. The multicast capable router may receive, from another router, the message along with a value indicating that the number of desired recipients of the message is a number, N1 (step 301). Alternatively, if the multicast capable router is the source of the message, the value of N1 is determined locally.

If it has not already done so, the multicast capable router generates a table that identifies sub-branches connected to the first multicast capable router. For each identified sub-branch, the table includes membership-related information from which it can be determined how many hosts are part of the sub-branch. Optionally, in accordance with some embodiments, the generated table further includes one or more metrics associated with each of the sub-branch hosts (step 303).

The multicast capable router uses the table to identify N1 hosts and their respective sub-branches (step 305). In a preferred embodiment, identifying the hosts involves finding those hosts whose associated one or more metrics satisfy some criteria, such as being closest to the multicast capable router.

The message is then distributed to each of the identified sub-branches along with a second value, N2, that specifies how many hosts within the sub-branch the message is to be distributed to (step 307). This permits a recipient multicast capable router to perform the same multicast process to its downstream hosts, this time using the value N2 as the number of desired message recipients.

An example will now be presented to illustrate a number of aspects of the invention.

Clients may register to the nearest multicast router with IGMP. In the state of the art protocols (e.g., MOSPF) a spanning tree (or any other kind of graph optimization tree) is established between the multicast routers. In the exemplary configuration shown in FIG. 2, R1 is the root with three branches (R3, R6, R7–R8).

As described above, the following basic steps are preferably performed for a subgroup multicasting:

1. Count the total number of recipients available to the entity that is to perform the sub-group multicasting (if this information is not already available via some other means, e.g., administration).

As described above, local routers only receive information from one member of a specific multicast group. Other members refrain from sending their membership information as soon as another member has already reported this information. Two solutions to this are: a) to have each member multicast its membership to the local router and all other hosts connected to the local network; or—more efficiently—b) to have each member unicast its membership to the local router. The local router can indicate the membership reporting method expected in the IGMP Membership Query Message (see e.g., IGMPv3).

After one single or several clients have registered to a multicast router, that router informs the next multicast router on the way to the root multicast router about the number of hosts connected. In order to have the mechanism take the corresponding metric into account, not only the number of hosts, but also the metrics are sent. Any of the existing multicasting routing messages or the IGMP messages between the multicast routers may be extended by this information.

Figure 4:
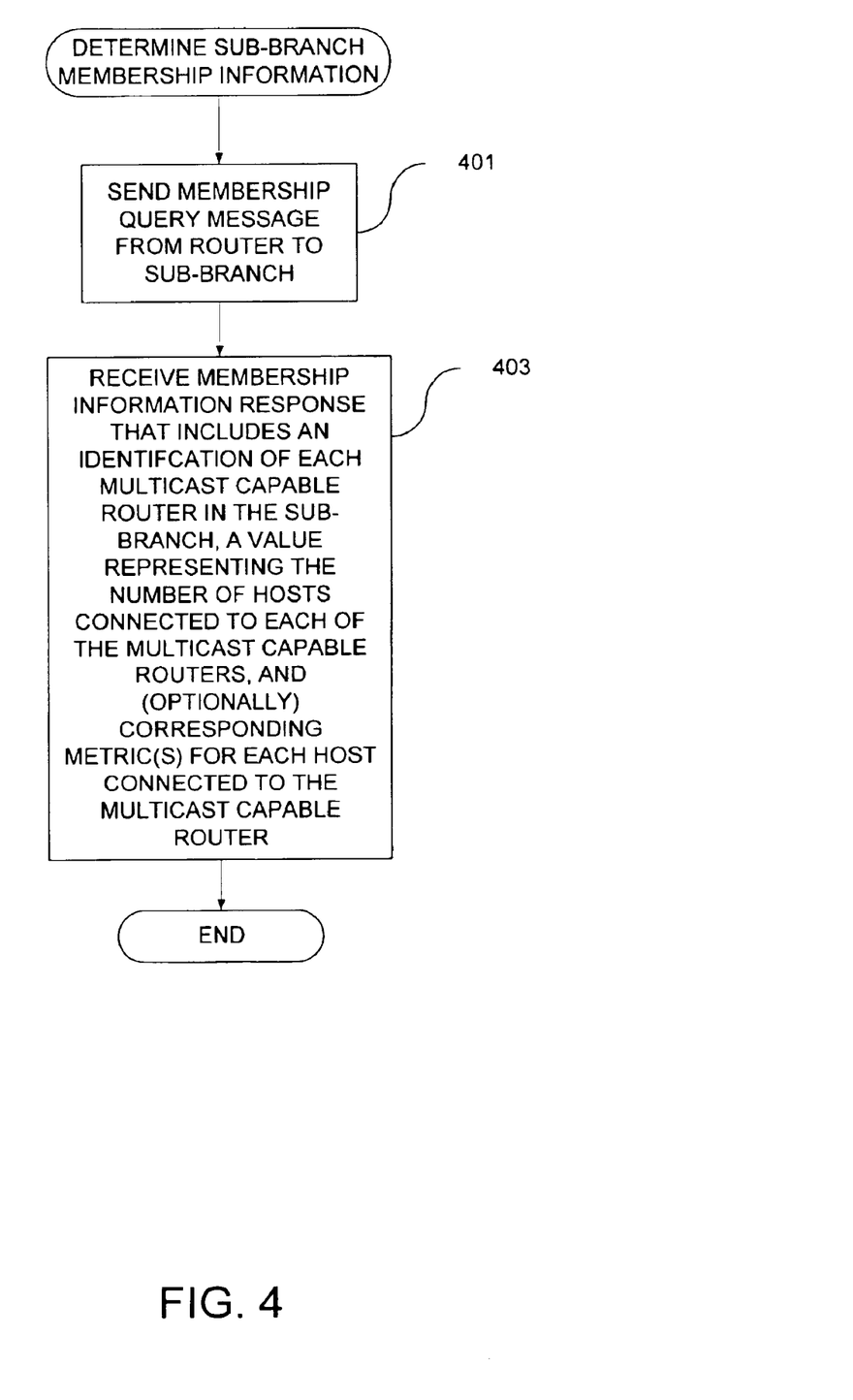
FIG. 4 is a flow chart depicting a technique for determine sub-branch membership information in accordance with another aspect of the invention.

The procedure for determining sub-branch membership information is illustrated in the flowchart presented in FIG. 4. A router initiates the procedure by sending a membership query message to the sub-branch (step 401). In response to the query, the router receives a membership information response from the sub-branch (step 403). The membership information response identifies, for the sub-branch, an identification of each multicast capable router in the sub-branch. For each of the identified multicast capable routers, the membership information response further includes a value representing the number of hosts connected to the identified multicast capable router. Optionally, in some embodiments of the invention, the membership information response further includes one or more corresponding metrics for each of the hosts connected to each multicast capable router in the sub-branch.

Figure 2:
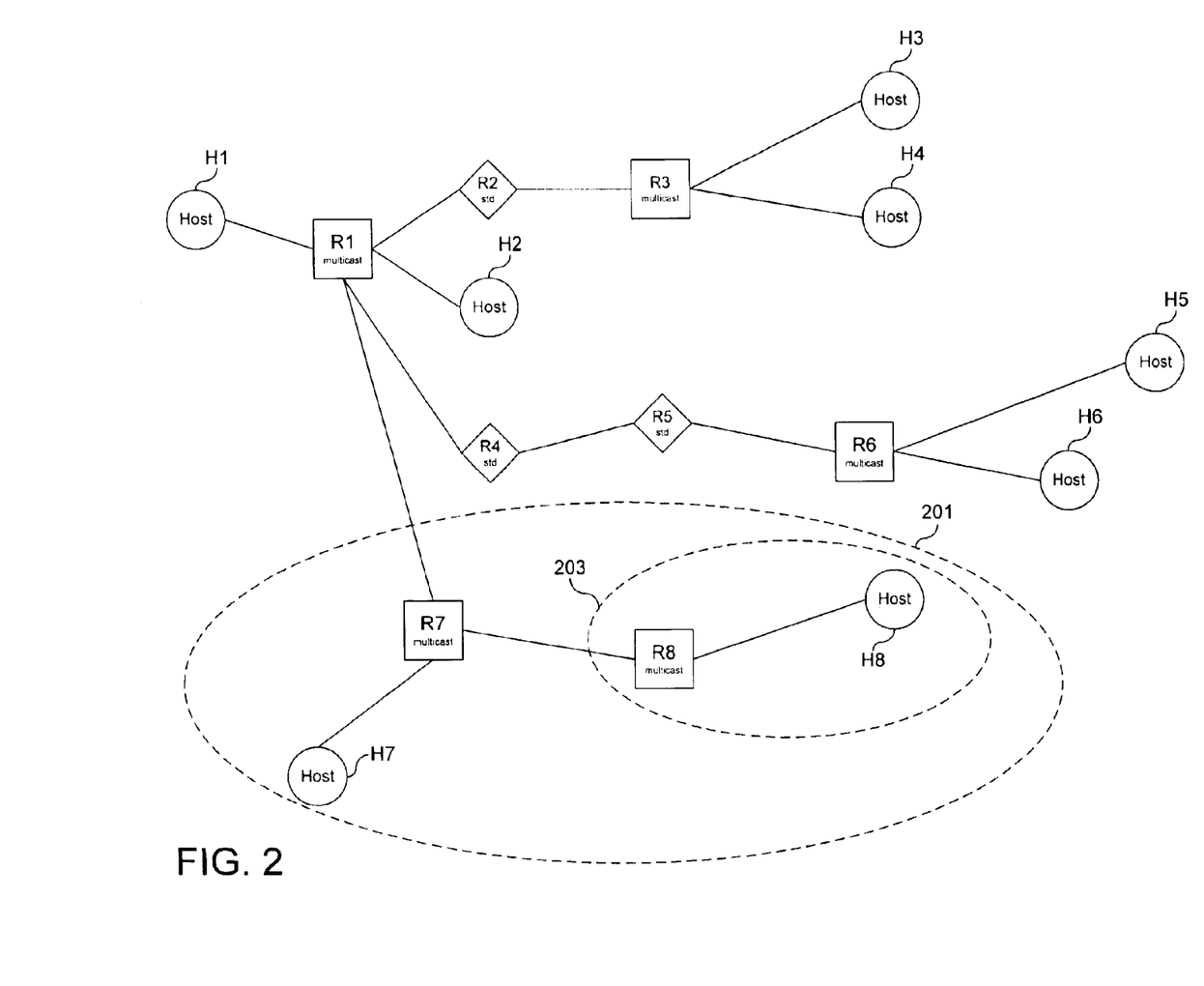
FIG. 2 is a block diagram of a portion of a communications network in accordance with an aspect of the invention, wherein the communications network comprises a number of Hosts (H1, H2, H3, H4, H5, H6, H7, H8) interconnected in various ways by means of multicast capable routers (R1, R3, R6, R7, R8) and standard (non-multicast capable) routers (R2, R4, R5)

In the example of FIG. 2, the following additional information will be sent by the corresponding multicast routers, assuming for the sake of example that the pertinent metric is the distance from the Host to the router (note that non-multicast routers forward the information transparently):

| From/To Router | Hosts | Distance |
|---|---|---|
| R3/R1 | 2 | 1 |
| R6/R1 | 2 | 1 |
| R8/R7 | 1 | 1 |
| R7/R1 | 1 | 2 |
| "/" | 1 | 1 |

From all the information received and taking into account the corresponding distances between the multicast routers themselves, R1 will generate a table, such as the following:

| Via | Hosts | Distance |
|---|---|---|
| directly (via IGMP) | 1 | 1 |
| R2 | 2 | 3 |
| R4 | 2 | 4 |
| R7 | 1 | 2 |
| " | 1 | 3 |
| Total number of hosts: | 7 | |

Each multicast router now knows the total number of recipients in its corresponding sub-branch, including the related distances. This implies that the root (i.e., R1 in this exemplary topology) knows the total number of recipients.

The collected information about the number of multicast group members can be used for dimensioning, statistics, billing, and the like. As described below, one application is to use a multicast message as a quorum consensus (QC) synchronization message.

The counting of the number of members per sub-branch can be triggered upon request from a host/server or the root of the multicast delivery tree. Furthermore, the existing multicast delivery tree building protocols may be extended with this information. When triggered by a host/server or the root, a simple request/reply mechanism may be used which is recursively forwarded to the sub-branches of the multicast delivery tree. The counting may also be done periodically (e.g., every 10 minutes), since the number of members of a multicast group may change dynamically.

2. Count the number of recipients per sub-branch.

See point 1 above: The generated table includes information from which the number of recipients per sub-branch, along with their associated metric(s), can be determined. For example, it can be seen from the generated table that two Hosts are accessible via router R7: one at a distance of "2", and another at a distance of "3" (the pertinent metric in this case being "distance").

3. Multicast the information only to a subgroup of the total group of multicast recipients.

The source sends the multicast message (e.g. a QC synchronization message) to the multicast group with the information about the number of recipients in that sub-branch that must receive the message. A recursive process is then performed whereby the multicast routers within each sub-branch perform the same steps described above to further multicast the message to only a certain number of hosts in selected sub-branches as necessary to ensure that the correct number of hosts receive the message.

For example, assuming that the message is to be sent to four recipients, the following will happen:

R1 will receive the message and look into its table for the "nearest" four recipients from the multicast group. (The assumption here is that the metric represents distance, and that Host selection is based on which Hosts are nearest the sender; neither of these conditions is essential to practicing the invention.) The four nearest ones (determined from the distance in the table) are the one that is directly connected (Host H1 at distance 1), the one connected to R7 (Host H7 at distance 2) and either the 2 connected to R3 (Hosts H3 and H4 at distance 3) or one of these (either of Hosts H3 and H4) and the one connected to R8 (Host H8 at distance 3). Assuming for the sake of illustration that the two connected to R3 are chosen, R1 will send out the following information to the multicast routers:

| To | Number of Hosts to be Informed |
|----|-------------------------------|
| R2 | 2                             |
| R7 | 1.                            |

Note that the identity of the Hosts is not determined at this point. Instead, this determination is a result of the recursive execution of this technique in each of the "downstream" multicast-capable routers. Thus, to continue the example, R2 (in turn) will send a message to R3, indicating that two hosts are to be informed.

Note that no message is sent to R4 (since none of its hosts are close enough to the source of the information message).

A multicast router receiving a message indicating a number of members in its local network to be informed has some options for the provision of the information:

It may always multicast the message on the local network, since many applications do not care whether too many members receive a message. This keeps the mechanism simple. In some embodiments, it may be beneficial to make this merely an option by adding an indicator to the multicast message (e.g., in an optional header extension, such as a standard IP optional header extension) to inform the recipient of whether it is permitted to multicast the message to too many members (i.e., more than the number actually specified in the subgroup multicast message).

Alternatively, since the multicast router knows the members from the solutions described in step 1, it can send dedicated unicast messages to just the number of members that have to be informed according to the received subgroup multicast message. In case the number of members is smaller or equal to the number indicated in the message, all members will be informed by means of a multicasting in the local network.

In other alternatives, the multicast router itself uses the sub-group multicast technique described above, thereby permitting a "downstream" multicast-capable router make the decision regarding which Hosts should be recipients.

Note: Reliability is achieved by means of the acknowledgments (from the recipients) as defined for the reliable multicasting protocols. This applies to step 3 in the list above.

Multicasting is "best effort", meaning that the sender of a message does not know whether and how many members have received the message. As described above, reliable multicast protocols may provide positive (ACK) or negative (NACK) acknowledgments.

In addition to the existing reliable multicasting mechanisms, the subgroup multicasting may aggregate the confirmations as follows: A local multicast router receives the confirmations from the directly connected members and compiles this into a confirmation message towards the next multicast router in the path towards the root. The message indicates the number of members in the sub-branch that confirmed (positively) the receipt of the message. Each multicast router does this and the root receives the total number of confirmations for the whole network (multicast delivery tree).

Note that the mechanisms described above also apply to shared multicast delivery trees, where one multicast delivery tree is used by many senders. In such a shared tree there are several roots.

A number of benefits are derived from the invention. First, the invention makes it possible to multicast messages to only a subgroup of a defined set of membership hosts.

Also, compared to the use of RTCP for conveying information about the participants in a session, this mechanism is able to provide this information before the start of the session. It also provides information to the different multicast routers about the number of hosts connected to the different sub-branches. This information may then also be used for other purposes.

The solution described above also provides mechanisms to count the number of multicast group members per sub-branch in a network. This information is reported to the other multicast routers on the way to the root (or reference point) of a multicast routing tree, where it can be used for several purposes (e.g., dimensioning, statistics, billing, service distribution decisions and the like). Once the total number of multicast group members is known, this information is used to provide a more efficient subgroup multicasting. Sources can specify the number of members that should receive a specific multicast message and the routing mechanism ensures that the nearest hosts (or hosts satisfying some other metric-based criteria) receive the message. The nearest can be any metric as already specified for IP today.

An example application for this efficient mechanism is Quorum Consensus synchronization for replicated servers. Here, in order to satisfy the total capacity and delay requirements imposed on it, a server is replicated in the network. Clients are connected any of the different replicas. The selection of the replica for a specific client may be based on such considerations as distance, availability, and the like. The service that is provided by the servers to the clients is a real-time interactive service, such as a multi-user game or a virtual world. Clients interact with the service (environment) and receive updated information from the service environment in real time. Because of the multi-user and real-time interactive character of the service, there is a need for the servers to keep each other synchronized.

This synchronization can advantageously employ the metric-based subgroup multicasting techniques described above. For example, whenever a server performs a local update, it synchronizes other servers/replicas by informing them about the update. Traditionally, such an update is sent to all replicas. However, with quorum consensus synchronization, only a subset of the replicas needs to be synchronized (i.e., the system only needs enough to form an updated consensus). If the total number of replicas is known, the size of the subset for the quorum consensus synchronization is known from the corresponding mechanism that is to be applied. To use a numerical example, assume that the total number of replicas is 10 and that the subset to be synchronized is 6. Metric-based subgroup multicasting can be applied to synchronize the 5 nearest replicas to the one where the initial update was done (e.g., the "nearest" as defined by a delay metric). The same approach can be applied to a read access. In that case, to use the same numerical example, a read must be done to a subset of 5 replicas to ensure that at least one replica has the latest (i.e., correct) status.

Thus, given a total of 10 replicas, write accesses only need to be performed to at least 6 replicas and read accesses only need to be performed from at least 5 replicas. The delay distance-based metric subgroup multicast ensures that for the write accesses, the nearest 6 replicas are contacted, and that for the read accesses, the nearest 5 replicas are contacted. The benefit obtained from this approach is efficient transmission by means of multicast is applied, but only the minimum number of replicas is contacted, thereby making efficient use of the network communication resources.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, it has been described how a multicast router may request information regarding the number of members in a sub-branch. However, in alternative embodiments, this request may also be made by a Host or server. This can easily be done with a query/response mechanism.

Also, the invention has been described in terms of embodiments in which a message indicates a number of hosts that are to receive the message. However, in alternative embodiments, the message may instead indicate a percentage of members that are to receive the message (e.g., it may be indicated that 30% of the members are to receive the message). In such embodiments, the root multicast router can then use information from its generated table (i.e., information indicating the total number of members) to map the value expressed in percentages to an actual number of members.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of distributing a message from a source to one or more hosts in a communications network that comprises one or more multicast capable routers, the method comprising:

in a first multicast capable router, generating a first table that identifies sub-branches connected to the first multicast capable router, and for each identified sub-branch, includes membership-related information from which it can be determined how many hosts are part of the sub-branch;

in the first multicast capable router, receiving the message to be distributed and a first value, N1, that specifies how many hosts the message is to be distributed to;

in the first multicast capable router, using the first table to identify N1 hosts and their respective sub-branches; and in the first multicast capable router, distributing the message to each of the identified sub-branches along with a second value, N2, that specifies how many hosts within the sub-branch the message is to be distributed to.

2. The method of claim 1, wherein:

at least one of the identified sub-branches includes a second multicast capable router; and the method further comprises:

in each of the second multicast capable routers, generating a second table that identifies sub-branches connected to the second multicast capable router, and for each identified sub-branch, includes membership-related information from which it can be determined how many hosts are part of the sub-branch;

in the second multicast capable router, using the second table to identify N2 hosts and their respective sub-branches; and in the second multicast capable router, distributing the message to each of the identified sub-branches along with a third value, N3, that specifies how many hosts within the sub-branch the message is to be distributed to.

3. The method of claim 1, wherein:

the first table further includes, for each identified sub-branch, a first metric associated with each of the sub-branch hosts; and the step of using the first table to identify N1 hosts and their respective sub-branches includes, for each table entry, examining the first metric to determine whether host satisfies criteria for being selected as one of the N1 hosts.

4. The method of claim 3, wherein:

the table further includes at least one additional metric, different from the first metric, associated with each of the sub-branch hosts; and the step of using the first table to identify N1 hosts and their respective sub-branches further includes, for each table entry, also examining the at least one additional metric to determine whether a host satisfies criteria for being selected as one of the N1 hosts.

5. The method of claim 3, wherein the first metric associated with each sub-branch host indicates a distance between the associated sub-branch host and the second multicast capable router.

6. The method of claim 5, wherein the step of using the first table to identify N1 hosts and their respective sub-branches comprises using the first table to identify N1 nearest hosts and their respective sub-branches.

7. The method of claim 3, wherein the first metric associated with each sub-branch host indicates a delay between the associated sub-branch host and the second multicast capable router.

8. The method of claim 3, wherein the first metric associated with each sub-branch host indicates a cost associated with communication between the associated sub-branch host and the second multicast capable router.

9. The method of claim 3, wherein the first metric associated with each sub-branch host indicates a bandwidth associated with communication between the associated sub-branch host and the second multicast capable router.

10. The method of claim 3, wherein the first metric associated with each sub-branch host indicates a transmission delay between the associated sub-branch host and the second multicast capable router.

11. The method of claim 10, further comprising:
in the first multicast router, determining a transmission delay between the first multicast router the sub-branch host.

12. The method of claim 3, wherein the first metric associated with each sub-branch host indicates a reliabillity of communication between the associated sub-branch host and the second multicast capable router.

13. The method of claim 1, wherein at least one of the identified sub-branches includes a router that does not have multicast capability.

14. The method of claim 1, wherein the step of generating the first table comprises:
sending a membership query message from the first multicast capable router to each sub-branch connected to the first multicast capable router;
receiving a membership information response from each sub-branch in response to the membership query message, wherein each membership information response identifies, for the sub-branch, an identification of each multicast capable router in the sub-branch; and
generating the first table from the membership information response received from the sub-branches.

15. The method of claim 14, wherein each membership information response further identifies, for the sub-branch, a corresponding first metric for each host in the sub-branch.

16. The method of claim 14, wherein each multicast capable muter in each sub-branch responds to receipt of the membership query message by:
determining a delay time; and
sending a membership information response after the delay time has elapsed only if each multicast capable router in said each sub-branch has not detected a membership information response being sent by a different multicast capable router in the sub-branch.

17. The method of claim 1, wherein the first table is generated periodically.

18. The method of claim 1, wherein:
at least one of the identified sub-branches includes a second multicast capable router; and
the method further comprises:
in each of the second multicast capable routers, unicasting the message to one or more hosts within the sub-branch.

19. The method of claim 18, wherein from each of the second multicast capable routers, the message is unicast to N2 hosts within the sub-branch.

20. The method of claim 1, wherein:
at least one of the identified sub-branches includes a second multicast capable router; and
the method further comprises:
in each of the second multicast capable routers, multicasting the message to all hosts within the sub-branch.

21. The method of claim 20, further comprising:
in each of the second multicast capable routers, first determining from the message whether it is permissible to distribute the message to more than N2 hosts prior to multicasting the message to all hosts within the sub-branch.

22. The method of claim 21, wherein an indication of whether it is permissible to distribute the message to more than N2 hosts is included in an optional header extension of the message.

23. A method of distributing a message from a source to one or more hosts in a communications network that comprises one or more multicast capable routers, the method comprising:

in a first multicast capable router, generating a first table that identifies sub-branches connected to the first multicast capable router, and for each identified sub-branch, includes membership-related information from which it can be determined how many hosts are part of the sub-branch;
in the first multicast capable router, receiving the message to be distributed and a first value, N1, that specifies a percentage of all multicast group members that the message is to be distributed to;
in the first multicast capable router, using the first table to identify a set of hosts that constitute N1 percent of all multicast group hosts and their respective sub-branches; and
in the first multicast capable router, distributing the message to each of the identified sub-branches along with a second value, N2, that specifies how many hosts within the sub-branch the message is to be distributed to.

24. A method of determining how many hosts are members of a sub-branch that is connected to a local router in a digital communications network, the method comprising:
sending a membership query message from the router to the sub-branch; and
receiving a membership information response from the sub-branch in response to the membership query message, wherein the membership information response identifies, for the sub-branch, an identification of each multicast capable router in the sub-branch and a value representing the number of hosts connected to each multicast capable routers;
wherein each multicast can able router in the sub-branch responds to receipt of the membership query message query determining a delay time, and sending a membership information response after the delay time has elapsed only if each multicast capable router in the sub-branch has not detected a membership information response being sent by a different multicast capable router in the sub-branch.

25. The method of claim 24, wherein the membership information further identifies, for the sub-branch, a corresponding first metric for each host connected each multicast capable router in the sub-branch.

26. The method of claim 25, wherein the first metric indicates a distance between the host and the multicast capable router.

27. The method of claim 24, wherein the sub-branch recursively generates a membership information response by propagating a membership query message downstream to each of the multicast capable routers within the sub-branch, and updating a membership information response as it is returned upstream from one multicast capable router to the next.

28. The method of claim 24, further comprising generating the value representing the number of hosts connected to each multicast capable router by:
multicasting membership information from each member in the sub-branch to local router of the sub-branch and to all other hosts connected to the network.

29. The method of claim 24, further comprising generating the value representing the number of hosts connected to each multicast capable router by:
unicasting membership information from each member in the sub-branch to the local router of the sub-branch; and
generating the member information response in the local router, based on membership information received from said each member in the sub-branch.

30. An apparatus for distributing a message from a source to one or more hosts in a communications network that comprises one or more multicast capable routers, the apparatus comprising:

in a first multicast capable router, logic that generates a first table that identifies sub-branches connected to the first multicast capable router, and for each identified sub-branch, includes membership-related information from which it can be determined how many hosts are part of the sub-branch;

in the first multicast capable router, logic that receives the message to be distributed and a first value, N1, that specifies how many hosts the message is to be distributed to;

in the first multicast capable router, logic that uses the first table to identify N1 hosts and their respective sub-branches; and in the first multicast capable router, logic that distributes the message to each of the identified sub-branches along with a second value, N2, that specifies how many hosts within the sub-branch the message is to be distributed to.

31. The apparatus of claim 30, wherein:

at least one of the identified sub-branches includes a second multicast capable router; and the apparatus further comprises:

in each of the second multicast capable routers, logic that generates a second table that identifies sub-branches connected to the second multicast capable router, and for each identified sub-branch, includes membership-related information from which it can be determined how many hosts are part of the sub-branch;

in the second multicast capable router, logic that uses the second table to identify N2 hosts and their respective sub-branches; and in the second multicast capable router, logic that distributes the message to each of the identified sub-branches along with a third value, N3, that specifies how many hosts within the sub-branch the message is to be distributed to.

32. The apparatus of claim 30, wherein:

the first table further includes, for each identified sub-branch, a first metric associated with each of the sub-branch hosts; and the logic that uses the first table to identify N1 hosts and their respective sub-branches includes logic that examines, for each table entry, the first metric to determine whether a host satisfies criteria for being selected as one of the N1 hosts.

33. The apparatus of claim 32, wherein:

the table further includes at least one additional metric, different from the first metric, associated with each of the sub-branch hosts; and the logic that uses the first table to identify N1 hosts and their respective sub-branches includes, logic that examines, for each table entry, the first metric and the at least one additional metric to determine whether a host satisfies criteria for being selected as one of the N1 hosts.

34. The apparatus of claim 32, wherein the first metric associated with each sub-branch host indicates a distance between the associated sub-branch host and the second multicast capable router.

35. The apparatus of claim 34, wherein the logic that uses the first table to identify N1 hosts and their respective sub-branches comprises logic that uses the first table to identify N1 nearest hosts and their respective sub-branches.

36. The apparatus of claim 32, wherein the first metric associated with each sub-branch host indicates a delay between the associated sub-branch host and the second multicast capable router.

37. The apparatus of claim 32, wherein the first metric associated with each sub-branch host indicates a cost associated with communication between the associated sub-branch host and the second multicast capable router.

38. The apparatus of claim 32, wherein the first metric associated with each sub-branch host indicates a bandwidth associated with communication between the associated sub-branch host and the second multicast capable router.

39. The apparatus of claim 32, wherein the first metric associated with each sub-branch host indicates a transmission delay between the associated sub-branch host and the second multicast capable router.

40. The apparatus of claim 39, further comprising:

in the first multicast router, logic that determines a transmission delay between the first multicast router and the sub-branch host.

41. The apparatus of claim 32, wherein the first metric associated with each sub-branch host indicates a reliability of communication between the sub-branch host and the second multicast capable router.

42. The apparatus of claim 30, wherein at least one of the identified sub-branches includes a router that does not have multicast capability.

43. The apparatus of claim 30, wherein the logic that generates the first table comprises:

logic that sends a membership query message from the first multicast capable router to each sub-branch connected to the first multicast capable router;

logic that receives a membership information response from each sub-branch in response to the membership query message, wherein each membership information response identifies, for the sub-branch, an identification of each multicast capable router in the sub-branch; and logic that generates the first table from the membership information response received from the sub-branches.

44. The apparatus of claim 43, wherein each membership information response further identifies, for the sub-branch, a corresponding first metric for each host in the sub-branch.

45. The apparatus of claim 43, wherein each multicast capable router in each sub-branch includes logic that responds to receipt of the membership query message, said logic comprising:

logic that determines a delay time; and logic that sends a membership information response after the delay time has elapsed only if each multicast capable router in the sub-branch has not detected a membership information response being sent by a different multicast capable router in the sub-branch.

46. The apparatus of claim 30, wherein the first table is generated periodically.

47. The apparatus of claim 30, wherein:

at least one of the identified sub-branches includes a second multicast capable router; and the apparatus further comprises:

in each of the second multicast capable routers, logic that unicasts the message to one or more hosts within the sub-branch.

48. The apparatus of claim 47, wherein from each of the second multicast capable routers, the message is unicast to N2 hosts within the sub-branch.

49. The apparatus of claim 30, wherein:

at least one of the identified sub-branches includes a second multicast capable router; and the apparatus further comprises:

in each of the second multicast capable routers, logic that multicasts the message to all hosts within the sub-branch.

50. The apparatus of claim 49, further comprising:

in each of the second multicast capable routers, logic that first determines from the message whether it is permissible to distribute the message to more than N2 hosts prior to multicasting the message to all hosts within the sub-branch.

51. The apparatus of claim 50, wherein an indication of whether it is permissible to distribute the message to more than N2 hosts is included in an optional header extension of the message.

52. An apparatus for distributing a message from a source to one or more hosts in a communications network that comprises one or more multicast capable routers, the apparatus comprising:

in a first multicast capable router, logic that generates a first table that identifies sub-branches connected to the first multicast capable router, and for each identified sub-branch, includes membership-related information from which it can be determined how many hosts are part of the sub-branch;

in the first multicast capable router, logic that receives the message to be distributed and a first value, N1, that specifies a percentage of all multicast group members that the message is to be distributed to;

in the first multicast capable router, logic that uses the first table to identify a set of host that constitute N1 percent of all multicast group member host and their respective sub-branches; and in the first multicast capable router, logic that distributes the message to each of the identified sub-branches along with a second value, N2, that specifies how many hosts within the sub-branch the message is to be distributed to.

53. An apparatus for determining how many hosts are members of a sub-branch that is connected to a local router in a digital communications network, the apparatus comprising:

logic that sends a membership query message from the local router to the sub-branch; and logic that receives a membership information response from the sub-branch in response to the membership query message, wherein the membership information response identifies, for the sub-branch, an identification of each multicast capable router in the sub-branch and a value representing the number of hosts connected to each multicast capable router;

wherein each multicast capable router in the sub-branch includes logic that responds to receipt of the membership query message, said logic comprising:

logic that determines a delay time; and logic that sends a membership information response after the delay time has elapsed only if each multicast capable router in the sub-branch has not detected a membership information response being sent by a different multicast capable router in the sub-branch.

54. The apparatus of claim 53, wherein the membership information further identifies, for the sub-branch, a corresponding first metric for each host connected to each multicast capable router in the sub-branch.

55. The apparatus of claim 54, wherein the first metric indicates a distance between the corresponding host and the multicast capable router.

56. The apparatus of claim 53, wherein the sub-branch branch includes logic that recursively generates a membership information response by propagating a membership query message downstream to each of the multicast capable routers within the sub-branch, and updates a membership information response as it is returned upstream from one multicast capable router to the next.

57. The apparatus of clam 53, further comprising logic that generates the value representing the number of hosts connected to each multicast capable router by:

multicasting membership information from each member in the sub-branch to the local router of the sub-branch and to all other hosts connected to the network.

58. The apparatus of claim 53, further comprising generating the value representing the number of hosts connected to said each multicast capable router by:

unicasting membership information from each member in the sub-branch to the local router of the sub-branch; and generating the membership information response in the local router, based on membership information received from each member in the sub-branch.

\* \* \* \* \*